US012793972B2

(12) United States Patent
Yu et al.

(10) Patent No.: US 12,793,972 B2
(45) Date of Patent: Nov. 10, 2026

(54) COMPOSITE POSITIVE ELECTRODE PLATE AND PREPARATION METHOD AND APPLICATIONS THEREOF

(71) Applicant: AESC Japan Ltd., Kanagawa (JP)

(72) Inventors: Le Yu, Shanghai (CN); Qian Li, Shanghai (CN); Wenbin Lyu, Shanghai (CN)

(73) Assignee: AESC Japan Ltd., Kanagawa (JP)

( * ) Notice: Subject to any disclaimer, the term of this patent is extended or adjusted under 35 U.S.C. 154(b) by 487 days.

(21) Appl. No.: 18/539,203

(22) Filed: Dec. 13, 2023

(65) Prior Publication Data

US 2025/0183287 A1 Jun. 5, 2025

(30) Foreign Application Priority Data

Dec. 4, 2023 (CN) ........................ 202311653903.5

(51) Int. Cl.

| | |
|---|---|
| ***H01M 4/505*** | (2010.01) |
| ***H01M 4/02*** | (2006.01) |
| ***H01M 4/04*** | (2006.01) |
| ***H01M 10/0525*** | (2010.01) |
| ***H01M 10/0562*** | (2010.01) |

(52) U.S. Cl.

CPC ......... *H01M 4/505* (2013.01); *H01M 4/0404* (2013.01); *H01M 4/0419* (2013.01); *H01M 4/0435* (2013.01); *H01M 10/0525* (2013.01); *H01M 10/0562* (2013.01); *H01M 2004/021* (2013.01); *H01M 2004/028* (2013.01); *H01M 2300/008* (2013.01)

(58) Field of Classification Search

CPC .. H01M 4/505; H01M 4/0404; H01M 4/0419; H01M 4/0435; H01M 10/0525; H01M 10/0562

See application file for complete search history.

(56) References Cited

FOREIGN PATENT DOCUMENTS

| | | |
|---|---|---|
| CN | 117154202 | 12/2023 |
| JP | 2016134254 | 7/2016 |
| JP | 2022554128 | 12/2022 |
| JP | 2023008483 | 1/2023 |
| WO | 2023022492 | 2/2023 |

OTHER PUBLICATIONS

"Office Action of Japan Counterpart Application", issued on May 13, 2025, p. 1-p. 4.
"Office Action of Japan Counterpart Application", issued on Aug. 5, 2025, p. 1-p. 4.

*Primary Examiner* — Sarah A. Slifka
(74) *Attorney, Agent, or Firm* — JCIPRNET

(57) ABSTRACT

The disclosure provides a composite positive electrode plate and a preparation method and applications thereof. The composite positive electrode plate at least includes a positive electrode active material and a halide solid-state electrolyte. A chemical formula of the halide solid-state electrolyte is $Li_{2+a}Zr_{1-a}Fe_aCl_{6-x-y}Br_xI_y$, where $0<a\leq 0.5$, x=0 to 6, y=0 to 6, $x+y\leq 6$, and a compaction density of the composite positive electrode plate is 2.8 g/cm$^3$ to 3.4 g/cm$^3$. The composite positive electrode plate and the preparation method and applications thereof improve the compaction density of the positive electrode plate and thus enhance the rate performance and cycle life of the lithium-ion battery.

7 Claims, 1 Drawing Sheet

COMPOSITE POSITIVE ELECTRODE PLATE AND PREPARATION METHOD AND APPLICATIONS THEREOF

CROSS-REFERENCE TO RELATED APPLICATION

This application claims the priority benefit of China application serial no. 202311653903.5, filed on Dec. 4, 2023. The entirety of the above-mentioned patent application is hereby incorporated by reference herein and made a part of this specification.

BACKGROUND

Technical Field

The disclosure relates to the field of lithium-ion battery technology, and specifically, to a composite positive electrode plate and a preparation method and applications thereof.

Related Art

With the development of secondary batteries represented by lithium-ion batteries, lithium-ion batteries have been widely used in fields such as portable electronic products and electric vehicles. However, recently, accidents involving new energy vehicles happened frequently due to the use of flammable organic solvents as electrolytes in conventional lithium-ion batteries, which poses serious safety risks and cannot be completely solved by conventional improvement methods. In contrast, all-solid-state lithium-ion batteries adopting inorganic solid-state electrolytes exhibit higher safety. Nonetheless, a major challenge for all-solid-state lithium-ion batteries is the matching between the electrode material and the solid-state electrolyte to reduce the interface impedance and ensure the stability of the interface. However, the cost of commonly used solid-state electrolytes is high, and the matching between the solid-state electrolytes and the positive electrode material is low. The positive electrode material has issues such as a large irreversible capacity loss in the initial cycle, poor rate performance and cycle life, and a fast voltage decay.

SUMMARY

The disclosure provides a composite positive electrode plate and a preparation method and applications thereof. The composite positive electrode plate and the preparation method and applications thereof provided according to this application can improve the compaction density of the positive electrode plate and thus enhance the rate performance and cycle life of the lithium-ion battery. It is also possible to enhance the lithium-ion conduction ability of the composite positive electrode plate, while effectively suppressing side reactions between the composite positive electrode plate and the sulfide electrolyte under high voltage, and improving interface stability between the positive electrode plate and the solid-state electrolyte.

To solve the above technical problems, the disclosure is implemented according to the following technical solutions.

The disclosure provides a composite positive electrode plate at least including a positive electrode active material and a halide solid-state electrolyte. A chemical formula of the halide solid-state electrolyte is $Li_{2+a}Zr_{1-a}Fe_aCl_{6-x-y}Br_xI_y$, where $0<a\leq0.5$, x=0 to 6, y=0 to 6, $x+y\leq6$, and a compaction density of the composite positive electrode plate is 2.8 g/cm$^3$ to 3.4 g/cm$^3$.

In an embodiment of the disclosure, a median particle size D50 of the halide solid-state electrolyte is 0.1 μm to 10 μm.

In an embodiment of the disclosure, the positive electrode active material includes $nLi_2MnO_3\cdot(1-n)LiMO_2$, where an element M is selected from at least one of Ni, Co, and Mn, and n=0 to 1.

In an embodiment of the disclosure, the element M is selected from Mn, and n=0.2 to 0.5.

In an embodiment of the disclosure, an ionic conductivity of the halide solid-state electrolyte is greater than or equal to 1 mS/cm.

The disclosure further provides a method for preparing a composite positive electrode plate at least including steps below. A positive electrode active material, a halide solid-state electrolyte, a conductive agent, and a binder are uniformly mixed according to a mass ratio to obtain a mixed powder. The mixed powder is dry-pressed or sprayed onto a current collector with an acid corrosion-resistant conductive coating to obtain a composite positive electrode plate; or the mixed powder is dispersed into a solvent to obtain a slurry, the slurry is coated onto a current collector with an acid corrosion-resistant conductive coating, and drying and rolling are performed to obtain a composite positive electrode plate.

In an embodiment of the disclosure, the acid corrosion-resistant conductive coating includes one of a conductive carbon layer, a conductive polymer layer, a gold layer, and a silver layer, and a thickness of the acid corrosion-resistant conductive coating is 0.01 μm to 10 μm.

In an embodiment of the disclosure, a mass ratio of the positive electrode active material, the halide solid-state electrolyte, the conductive agent, and the binder is (64 to 75):(20 to 30):(1 to 2):(4 to 5).

The disclosure further provides a lithium-ion battery including the composite positive electrode plate described above.

The disclosure further provides an electronic device including the lithium-ion battery described above.

In summary of the above, the disclosure provides a composite positive electrode plate and a preparation method and applications thereof, which can obtain a low-cost, small-sized, high ionic conductivity, and high voltage-resistant halide solid-state electrolyte, improve the compaction density of the positive electrode plate, and thus enhance the rate performance and cycle life of the lithium-ion battery. At the same time, the halide solid-state electrolyte has good compatibility with the high-voltage positive electrode, which can improve the capacity of the lithium-ion battery and enhance the cycling performance. It is also possible to enhance the lithium-ion conduction ability of the composite positive electrode plate, while effectively suppressing side reactions between the composite positive electrode plate and the sulfide electrolyte under high voltage, improving interface stability between the positive electrode plate and the solid-state electrolyte, reducing side reactions, improving the initial Coulombic efficiency of the battery, suppressing dissolution of transition metals, and thus inhibiting voltage decay in the cycling process and enhancing the cycle life of the battery.

BRIEF DESCRIPTION OF DRAWINGS

In order to more clearly illustrate the technical solutions of the embodiments of the disclosure, the drawings required for the description of the embodiments will be briefly described below. Obviously, the drawings described below only show some embodiments of the disclosure. For those skilled in the art, other drawings may be obtained based on these drawings without creative effort.

DESCRIPTION OF EMBODIMENTS

Figure 1:
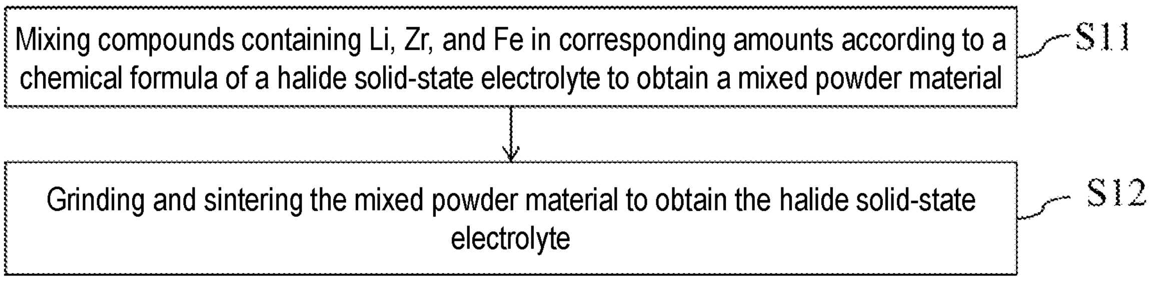
FIG. 1 is a flowchart for preparing a halide solid-state electrolyte according to the disclosure.

The following specific examples illustrate the embodiments of the disclosure, and those skilled in the art can easily understand other advantages and effects of the disclosure based on the content disclosed in this specification. The disclosure may also be implemented or applied according to other different specific embodiments, and various details in this specification may also be modified or changed based on different viewpoints and applications without departing from the spirit of the disclosure.

It should be understood that the disclosure may be implemented in different forms and should not be interpreted as being limited to the embodiments set forth herein. Instead, illustration of these embodiments is intended to make the disclosure thorough and complete and to fully convey the scope of the disclosure to those skilled in the art. Unless specifically stated, "%" and "parts" shown in the following embodiments and examples refer to "mass %" and "parts by mass", respectively.

The technical solutions of the disclosure will be further detailed with reference to several embodiments and the accompanying drawings. Obviously, the described embodiments only form a part of the embodiments of the disclosure rather than all of them. All other embodiments obtained by those skilled in the art based on the embodiments in the disclosure without making creative efforts fall within the scope of protection of the disclosure.

The disclosure provides a composite positive electrode plate, which includes a current collector and a positive electrode active layer coated on the current collector. The current collector is, for example, a current collector with an acid corrosion-resistant conductive coating. The current collector is any suitable positive electrode current collector such as an aluminum foil, a stainless steel foil, a titanium foil, etc. The acid corrosion-resistant conductive coating includes one of a conductive carbon layer, a conductive polymer layer, a gold layer, and a silver layer, and the thickness of the acid corrosion-resistant conductive coating is 0.01 μm to 10 μm. The positive electrode active layer at least includes a positive electrode active material and a halide solid-state electrolyte, and the thickness of the positive electrode active layer is, for example, 80 μm to 140 μm. This application provides a low-cost, small-sized, high-ion conductivity, and high voltage-resistant halide solid-state electrolyte, which can improve the compaction density of the positive electrode plate and thus enhance the rate performance and cycle life of the battery. At the same time, it is possible to address the issue of interface instability between high-voltage lithium-rich manganese-based materials and conventional electrolyte materials (e.g., $Li_3InCl_6$), reduce side reactions, improve the initial Coulombic efficiency of the battery, inhibit dissolution of transition metals, and thus inhibit voltage decay in the cycling process.

In an embodiment of the disclosure, the chemical formula of the halide solid-state electrolyte is $Li_{2+a}Zr_{1-a}Fe_aCl_{6-x-y}Br_xI_y$, where $0<a\leq0.5$, x=0 to 6, y=0 to 6, $x+y\leq6$, the ionic conductivity of the halide solid-state electrolyte is greater than or equal to 1 mS/cm, and a median particle size D50 of the halide solid-state electrolyte is, for example, 0.1 μm to 10 μm, or is, for example, 2 μm, 3 μm, 4 μm, 5 μm, 6 μm, 7 μm, 8 μm, etc. Accordingly, the matching between the size of the halide solid-state electrolyte and high-voltage lithium-rich manganese-based materials can be improved, and the compaction density of the composite positive electrode plate can reach 2.8 g/cm$^3$ to 3.4 g/cm$^3$. In an embodiment of the disclosure, the halide solid-state electrolyte is, for example, $Li_{2.3}Zr_{0.7}Fe_{0.3}Cl_6$. In this application, the halide solid-state electrolyte does not contain rare earth metals, which can significantly reduce costs, and the halide solid-state electrolyte takes iron as a doping element. Accordingly, while further reducing costs, the isovalent substitution of $Fe^{3+}$ in the lattice can improve the ionic conductivity of the halide solid-state electrolyte. At the same time, the particle size of the halide solid-state electrolyte matches the positive electrode active material, which can improve the rate performance and cycle life of the lithium-ion battery. Also, it has good compatibility with high-voltage positive electrode active materials, reduces side reactions, improves the initial Coulombic efficiency of the battery, inhibits dissolution of transition metals, and thus inhibits voltage decay in the cycling process and improves the cycle life of the battery.

In an embodiment of the disclosure, the positive electrode active material includes, for example, lithium-rich manganese-based materials such as high-voltage lithium-manganese-based composite oxides of $nLi_2MnO_3\cdot(1-n)LiMO_2$, where the element M is selected from at least one of Ni, Co, and Mn, and n=0 to 1. In an embodiment of the disclosure, the element M is selected from Mn, and n=0.2 to 0.5. In this embodiment, the positive electrode active material is composed of two components, $Li_2MnO_3$ and $LiMO_2$, combined in different proportions. The structure of the positive electrode active material is similar to an $\alpha$-$NaFeO_2$ layered structure, which has a higher discharge specific capacity to improve the capacity of the lithium-ion battery.

In an embodiment of the disclosure, the positive electrode active layer further includes a conductive agent, a binder, etc. The conductive agent is, for example, one or a combination of at least two of conductive carbon black (Super P, SP), carbon nanotube (CNT), vapor grown carbon fiber (VGCF), and graphene. In this embodiment, the conductive agent is, for example, a combination of conductive carbon black and vapor grown carbon fiber, and the mass ratio of conductive carbon black to vapor grown carbon fiber is, for example, 1:1. The binder is capable of being dispersed in a low-polarity solvent, and includes, for example, one or a combination of at least two of hydrogenated nitrile rubber (HNBR), styrenic block copolymers (SBS), styrene acrylate copolymer (SAC), acrylate, polymerized styrene butadiene rubber (SBR), nitrile butadiene rubber (NBR), silica gel, polyvinylidene fluoride (PVDF), and lithium carboxymethyl cellulose (CMC-Li). For example, the binder may be hydrogenated nitrile rubber, fluororubber, styrenic block copolymers, or polymerized styrene butadiene rubber. In an embodiment of the disclosure, the mass ratio of the positive electrode active material, the halide solid-state electrolyte, the conductive agent, and the binder is, for example, (64 to 75):(20 to 30):(1 to 2):(4 to 5).

Referring to FIG. 1, the disclosure further provides a method for preparing a halide solid-state electrolyte, which includes but is not limited to step S11 to step S12.

In step S11, according to a chemical formula of a halide solid-state electrolyte, compounds containing Li, Zr, and Fe in corresponding amounts are mixed to obtain a mixed powder material.

In step S12, the mixed powder material is ground and sintered to obtain the halide solid-state electrolyte.

Referring to FIG. 1, in step S11, according to the chemical formula $Li_{2+a}Zr_{1-a}Fe_aCl_{(6-x-y)}Br_xI_y$ of the halide solid-state electrolyte, compounds containing Li, Zr, and Fe ions in corresponding molar amounts are mixed to form a mixture and obtain a mixed powder material. In an embodiment of the disclosure, the chemical formula of the halide solid-state electrolyte is, for example, $Li_{2.3}Zr_{0.7}Fe_{0.3}Cl_6$, and the selected raw materials are, for example, lithium chloride (LiCl), zirconium chloride ($ZrCl_4$), iron chloride ($FeCl_3$), etc. In this embodiment, the raw materials are mixed by ball milling, for example, to make the mixing and contact of the raw materials more uniform. The rotational speed of the ball milling is, for example, 200 rpm to 500 rpm, or is, for example, 300 rpm. The mixing time of the ball milling is, for example, 1 h to 2 h, or is, for example, 1 h. The diameter of zirconia milling beads is, for example, 8 mm to 15 mm, or is, for example, 10 mm. The ball-to-material ratio is, for example, (20 to 30):1, or is, for example, 30:1.

Referring to FIG. 1, in an embodiment of the disclosure, in step S12, after the mixed powder material is obtained, the mixed powder material is treated by methods such as ball milling, solid phase sintering, or heating co-melting, and, for example, the mixed powder material is prepared by grinding and sintering. The rotational speed of the grinding is, for example, 500 rpm to 800 rpm, or is, for example, 600 rpm. The grinding time is, for example, 8 h to 15 h, or is, for example, 10 h. After the mixed powder material is ground, a median particle size D50 of the mixed powder is, for example, 0.1 μm to 10 μm, or is, for example, 2 μm, 3 μm, 4 μm, 5 μm, 6 μm, 7 μm, or 8 μm. The ground mixture is sintered to obtain a halide solid-state electrolyte. The heating rate of the sintering is, for example, 4° C./min to 5° C./min. The sintering temperature is, for example, 250° C. to 350° C. The sintering time is 3 to 5 hours. The sintering atmosphere is, for example, an inert gas. The sintering time is the time after heating to the sintering temperature. The sintering process can enhance the crystallinity of the halide solid-state electrolyte. After the sintering is completed, the halide solid-state electrolyte is cooled by furnace cooling. In the disclosure, Fe element is taken as a doping element in the halide solid-state electrolyte, and the isovalent substitution of $Fe^{3+}$ in the lattice can improve the ionic conductivity of the electrolyte. In an embodiment of the disclosure, the ionic conductivity of the halide solid-state electrolyte is, for example, ≥1 mS/cm.

Figure 2:
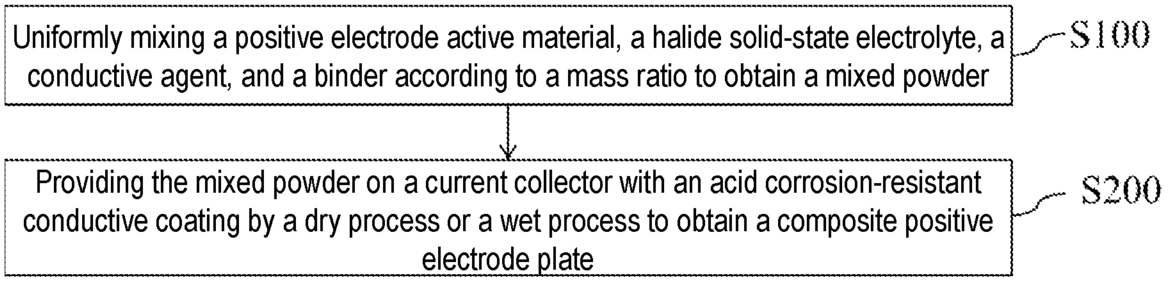
FIG. 2 is a flowchart for preparing a composite positive electrode plate according to the disclosure.

Referring to FIG. 2, the disclosure further provides a method for preparing a composite positive electrode plate, which includes but is not limited to step S100 to step S200.

In step S100, a positive electrode active material, a halide solid-state electrolyte, a conductive agent, and a binder are uniformly mixed according to a mass ratio to obtain a mixed powder.

In step S200, the mixed powder is provided on a current collector with an acid corrosion-resistant conductive coating by a dry process or a wet process to obtain a composite positive electrode plate.

Referring to FIG. 2, in an embodiment of the disclosure, in step S100, a positive electrode active material, a halide solid-state electrolyte, a conductive agent, and a binder are uniformly mixed according to a mass ratio to obtain a mixed powder. The mass ratio of the positive electrode active material, the halide solid-state electrolyte, the conductive agent, and the binder is, for example, (64 to 75):(20 to 30):(1 to 2):(4 to 5). In this embodiment, the mass ratio of the positive electrode active material, the halide solid-state electrolyte, the conductive agent, and the binder is, for example, 70:25:1:4. The conductive agent is a combination of conductive carbon black and vapor grown carbon fiber, and the mass ratio of conductive carbon black to vapor grown carbon fiber is 1:1.

Referring to FIG. 2, in an embodiment of the disclosure, in step S200, in a dry process, the uniformly mixed powder is dry-pressed or sprayed and rolled onto a current collector with an acid corrosion-resistant conductive coating to obtain a composite positive electrode plate. The current collector may be any suitable positive electrode current collector, such as an aluminum foil, a stainless steel foil, a titanium foil, etc. The acid corrosion-resistant conductive coating includes one of a conductive carbon layer, a conductive polymer layer, a gold layer, and a silver layer, and the thickness of the acid corrosion-resistant conductive coating is 0.01 μm to 10 μm. In a wet process, the uniformly mixed powder is dispersed into a solvent to obtain a slurry. The slurry is coated on a current collector with an acid corrosion-resistant conductive coating and dried and rolled to obtain a composite positive electrode plate. The solvent is, for example, a good solvent for the binder, such as low-polarity solvents of alkanes, benzenes, ethers, esters, etc., to obtain the slurry. The slurry is coated on the current collector with an acid corrosion-resistant conductive coating by a conventional wet process, the drying temperature is, for example, 80° C. to 200 °C, and the time is, for example, 0.5 h to 12 h. The rolling temperature is, for example, 50° C. to 70° C., the pressure is, for example, 70 MPa to 95 MPa, and the compaction density of the composite positive electrode plate after rolling is, for example, 2.8 g/cm$^3$ to 3.4 g/cm$^3$. The high compactness of the positive electrode active layer in this application can enhance the ion transport within and between the positive electrode active material and the halide solid-state electrolyte, exhibit higher capacity, and have excellent electrochemical performance.

The disclosure further provides a lithium-ion battery, which includes a positive electrode plate, a solid-state electrolyte, and a negative electrode plate, and the solid-state electrolyte is arranged between the positive electrode plate and the negative electrode plate. The solid-state electrolyte is selected from one or more of a halide, a sulfide, an oxide, and a polymer. In this embodiment, the solid-state electrolyte is selected from, for example, $Li_6PS_5Cl$. The positive electrode plate is the composite positive electrode plate obtained as described above. The negative electrode plate is selected from, for example, metal indium, metal lithium, an alloy, a carbon negative electrode, a tin-based negative electrode, or a nano-oxide. In this embodiment, the negative electrode plate is selected from, for example, a metal indium plate. The positive electrode plate is added to one side of the solid-state electrolyte and is, for example, pressed at a pressure of 300 MPa to press the positive electrode plate and the electrolyte layer together. Subsequently, the negative electrode plate is placed on the other side of the solid-state electrolyte, and upon sealing under vacuum or inert atmosphere, an all-solid-state lithium-ion battery is obtained.

The disclosure will be illustrated in more detail below with reference to examples, which should not be understood as being restrictive. Appropriate modifications may be made within the scope consistent with the gist of the disclosure, and all of such modifications fall within the technical scope of the disclosure.

Example 1

In an environment with a dew point of −30° C., a positive electrode active material $0.5Li_2MnO_3 \cdot 0.5LiMnO_2$, a halide solid-state electrolyte $Li_{2.3}Zr_{0.7}Fe_{0.3}Cl_6$, a conductive agent of Super P and VGCF, and a binder of hydrogenated nitrile rubber were dispersed into xylene according to a mass ratio 70:25:0.5:0.5:4. The viscosity of the slurry was adjusted by adjusting the amount of xylene added, and the solid content of the slurry was about 50%. The slurry was coated on an aluminum foil with a conductive carbon layer by scrape coating. The thickness of the aluminum foil was 13 μm, and the thickness of the conductive carbon layer was 1 μm. The coated current collector was air-dried at 110° C. for 2 hours, and then rolled and compacted at a pressure of 80 MPa at 60 °C The compaction density of the obtained composite positive electrode plate was 3.1 g/cm$^3$. In the composite positive electrode plate, the thickness of the positive electrode active layer was 100 μm.

A thin indium plate was taken as the negative electrode, and the solid-state electrolyte layer was $Li_6PS_5Cl$. The composite positive electrode plate was added to one side of the solid-state electrolyte layer and was pressed at a pressure of 300 MPa to press the positive electrode plate and the electrolyte layer together. Subsequently, the thin indium plate was placed on the other side of the electrolyte as the negative electrode plate, and upon sealing under vacuum, an all-solid-state lithium-ion battery was obtained.

Example 2

The composite positive electrode plate was rolled and compacted at a pressure of 95 MPa at 60 °C, and the compaction density of the obtained composite positive electrode plate was 3.4 g/cm$^3$. All other operations remained consistent with Example 1.

Example 3

The composite positive electrode plate was rolled and compacted at a pressure of 70 MPa at 60 °C, and the compaction density of the obtained composite positive electrode plate was 2.8 g/cm$^3$. All other operations remained consistent with Example 1.

Comparative Example 1

The halide solid-state electrolyte in the composite positive electrode plate was replaced with a sulfide electrolyte $Li_6PS_5Cl$. All other operations remained consistent with Example 1.

Comparative Example 2

The composite positive electrode plate was rolled and compacted at a pressure of 30 MPa at 60 °C, and the compaction density of the obtained composite positive electrode plate was 2.0 g/cm$^3$. All other operations remained consistent with Example 1.

Comparative Example 3

The composite positive electrode plate was rolled and compacted at a pressure of 120 MPa at 60° C, and the compaction density of the obtained composite positive electrode plate was 4.0 g/cm$^3$. All other operations remained consistent with Example 1.

In the disclosure, lithium-ion batteries were prepared with different composite positive electrode plates in Example 1 to Example 3 and Comparative Example 1 to Comparative Example 3. At an environment of 25 °C, the all-solid-state lithium-ion batteries thus obtained were subjected to long cycle charging and discharging, and their initial discharge specific capacity and number of cycles were measured. The operating voltage range for battery testing was 1.5 V to 4.2 V, and the test rate was 0.3 C. The discharge capacity of each cycle was recorded. When the battery capacity reached 80% of the initial cycle capacity (80% state of health, 80% SOH), the test was ended, and the number of cycles at room temperature was obtained.

TABLE 1

Performance test results of lithium-ion batteries in Example 1 to Example 3 and Comparative Example 1 to Comparative Example 3

| Group | Electrode plate compaction density | Initial discharge specific capacity (mAh/g) | Number of cycles at room temperature (80% SOH) |
|---|---|---|---|
| Example 1 | 3.1 | 253 | 1241 |
| Example 2 | 3.4 | 242 | 1079 |
| Example 3 | 2.8 | 207 | 901 |
| Comparative Example 1 | 3.1 | 107 | 55 |
| Comparative Example 2 | 2.0 | 68 | — |
| Comparative Example 3 | 4.0 | short circuit | — |

As shown in Table 1, comparing Example 1 and Comparative Example 1, the addition of the halide solid-state electrolyte to the composite positive electrode plate improved the initial discharge specific capacity and room temperature cycling performance of the all-solid-state lithium-ion battery. That is, by adding the halide solid-state electrolyte, the capacity and cycling performance of the lithium-ion battery can be improved. This indicates that the halide solid-state electrolyte has good compatibility with high-voltage lithium-rich manganese-based materials, can effectively suppress side reactions between the composite positive electrode plate and the sulfide electrolyte under high voltage, enhance interface stability between the positive electrode and the solid-state electrolyte, reduce side reactions, improve the initial Coulombic efficiency of the battery, suppress dissolution of transition metals, and thus inhibit voltage decay in the cycling process and enhance the cycle life of the battery.

As shown in Table 1, comparing Example 1 to Example 3 and Comparative Example 2 to Comparative Example 3, as the compaction density of the composite positive electrode plate increased, the initial discharge specific capacity and room temperature cycling performance of the all-solid-state lithium-ion battery first increased and then decreased. When the compaction density was low, the porosity of the composite positive electrode plate increased, and a small amount or a part of the active substance lost contact, leading to a decrease in the performance of the lithium-ion battery. However, when the compaction density was high, a small amount of the halide solid-state electrolyte was crushed, leading to a decrease in the ionic conductivity inside the composite positive electrode plate and a decrease in the performance of the lithium-ion battery. A further increase in the compaction density caused the electrode plate to wrinkle and caused a short circuit. Thus, this application improves the compaction density of the composite positive electrode plate while controlling the range of the compaction density to thus enhance the rate performance and cycle life of the battery.

The disclosure further provides an electronic device, which includes at least one of the lithium-ion batteries described above, and the lithium-ion battery serves to provide electric energy. The electronic device may be a vehicle, a mobile phone, a portable device, a laptop, a ship, spacecraft, an electric toy, an electric tool, etc. In an embodiment of the disclosure, the vehicle is, for example, a new energy vehicle, which may be a pure electric vehicle, a hybrid vehicle, a range-extended vehicle, etc. The spacecraft includes an airplane, a rocket, a space shuttle, a spaceship, etc. The electric toy includes a stationary or moving electric toy, such as a game console, an electric toy car, an electric toy ship, an electric toy airplane, etc. The electric tool includes an electric metal cutting tool, an electric grinding tool, an electric assembly tool, and an electric railway tool, and includes, for example, an electric drill, an electric grinder, an electric wrench, an electric screwdriver, an electric hammer, an impact drill, a concrete vibrator, an electric planers, etc. The electronic device includes the lithium-ion battery described above, and thus includes the advantages of the lithium-ion battery, which will not be further elaborated on herein.

In summary of the above, the disclosure provides a composite positive electrode plate and a preparation method and applications thereof, which can obtain a low-cost, small-sized, high ionic conductivity, and high voltage-resistant halide solid-state electrolyte, improve the compaction density of the positive electrode plate, and thus enhance the rate performance and cycle life of the lithium-ion battery. At the same time, the halide solid-state electrolyte has good compatibility with the high-voltage positive electrode, which can improve the capacity of the lithium-ion battery and enhance the cycling performance. It is also possible to enhance the lithium-ion conduction ability of the composite positive electrode plate, while effectively suppressing side reactions between the composite positive electrode plate and the sulfide electrolyte under high voltage, improving interface stability between the positive electrode plate and the solid-state electrolyte, reducing side reactions, improving the initial Coulombic efficiency of the battery, suppressing dissolution of transition metals, and thus inhibiting voltage decay in the cycling process and enhancing the cycle life of the battery.

The above description only showed the exemplary embodiments and examples of this application and described the technical principles involved. Those skilled in the art should understand that the scope of the disclosure involved in this application is not limited to the technical solutions formed by the specific combination of the above technical features, but should also cover other technical solutions formed by any combination of the above technical features or their equivalent features without departing from the concept of the disclosure, such as technical solutions formed by replacing the above features with (but not limited to) technical features with similar functions disclosed in this application.

In addition to the technical features described in the specification, the remaining technical features are known to those skilled in the art. To highlight the innovative features of the disclosure, the remaining features will not be repeatedly described herein.

What is claimed is:

1. A composite positive electrode plate, at least comprising:

a positive electrode active material; and a halide solid-state electrolyte, wherein a chemical formula of the halide solid-state electrolyte is $Li_{2+a}Zr_{1-a}Fe_aCl_{6-x-y}Br_xI_y$, wherein $0<a\leq0.5$, x=0 to 6, y=0 to 6, $x+y\leq6$, and a compaction density of the composite positive electrode plate is 2.8 $g/cm^3$ to 3.4 $g/cm^3$.

2. The composite positive electrode plate according to claim 1, wherein a median particle size D50 of the halide solid-state electrolyte is 0.1 μm to 10 μm.

3. The composite positive electrode plate according to claim 1, wherein the positive electrode active material comprises $nLi_2MnO_3\cdot(1-n)LiMO_2$, wherein an element M is selected from at least one of Ni, Co, and Mn, and n=0 to 1.

4. The composite positive electrode plate according to claim 3, wherein the element M is selected from Mn, and n=0.2 to 0.5.

5. The composite positive electrode plate according to claim 1, wherein an ionic conductivity of the halide solid-state electrolyte is greater than or equal to 1 mS/cm.

6. A lithium-ion battery comprising the composite positive electrode plate according to claim 1.

7. An electronic device comprising the lithium-ion battery according to claim 6.

* * * * *